(12) United States Patent
Tyan et al.

(10) Patent No.: US 7,492,992 B1
(45) Date of Patent: Feb. 17, 2009

(54) BI-DIRECTIONAL PLC TRANSCEIVER DEVICE

(75) Inventors: Rongchung Tyan, Irvine, CA (US); Hee Choon Kang, Torrance, CA (US); Edgar A. Mendoza, Redondo Beach, CA (US); Lothar U. Kempen, Redondo Beach, CA (US)

(73) Assignee: Neophotonics Corporation, San Jose, CA (US)

( * ) Notice: Subject to any disclaimer, the term of this patent is extended or adjusted under 35 U.S.C. 154(b) by 0 days.

(21) Appl. No.: 10/637,199

(22) Filed: Aug. 8, 2003

(51) Int. Cl.
*G02B 6/26* (2006.01)
*G02B 6/42* (2006.01)

(52) U.S. Cl. ............... 385/45; 385/15; 385/31; 385/39; 385/42; 385/49; 385/50

(58) Field of Classification Search ........... 385/14–15, 385/18, 31, 33, 36–37, 39, 42–45, 47, 49–52, 385/88–95; 359/558, 566, 569, 572, 885; 398/82, 84–85, 140–141, 153; 250/227.28
See application file for complete search history.

(56) References Cited

U.S. PATENT DOCUMENTS

| | | | |
|---|---|---|---|
| 4,165,496 A * | 8/1979 | Di Domenico et al. ......... 372/31 |
| 4,468,085 A * | 8/1984 | Papuchon et al. ............. 385/14 |
| 4,693,544 A * | 9/1987 | Yamasaki et al. ............. 385/47 |
| 4,790,615 A * | 12/1988 | Seki et al. .................... 385/129 |
| 4,842,357 A * | 6/1989 | Doneen ......................... 385/12 |
| 5,005,935 A * | 4/1991 | Kunikane et al. ............. 398/86 |
| 5,088,105 A * | 2/1992 | Scifres et al. ................. 372/92 |
| 5,098,804 A * | 3/1992 | Booth .......................... 430/1 |
| 5,191,625 A * | 3/1993 | Gustavsson ................... 385/14 |
| 5,425,118 A * | 6/1995 | Sugihara et al. ............... 385/51 |
| 5,479,547 A * | 12/1995 | Kunikane et al. ............. 385/47 |
| 5,579,154 A * | 11/1996 | Mueller-Fiedler et al. ........................ 359/341.1 |
| 5,583,683 A * | 12/1996 | Scobey ......................... 398/79 |
| 5,633,962 A * | 5/1997 | Kurata ......................... 385/24 |
| 5,699,187 A * | 12/1997 | Fukushima et al. ......... 359/583 |
| 5,799,120 A * | 8/1998 | Kurata et al. ................. 385/45 |
| 5,825,951 A * | 10/1998 | Kitamura ..................... 385/45 |
| 5,894,535 A * | 4/1999 | Lemoff et al. ................ 385/47 |
| 5,943,461 A * | 8/1999 | Shahid ......................... 385/92 |
| 5,949,928 A * | 9/1999 | Kadoi et al. .................. 385/14 |
| 6,195,478 B1 * | 2/2001 | Fouquet ....................... 385/17 |
| 6,198,857 B1 * | 3/2001 | Grasis et al. .................. 385/24 |
| 6,215,917 B1 * | 4/2001 | Takahashi et al. ............ 385/14 |
| 6,243,516 B1 * | 6/2001 | Seino .......................... 385/47 |
| 6,304,697 B1 * | 10/2001 | Toyohara ..................... 385/50 |
| 6,356,692 B1 * | 3/2002 | Ido et al. ..................... 385/129 |
| 6,374,021 B1 * | 4/2002 | Nakanishi et al. ............. 385/49 |
| 6,408,121 B1 * | 6/2002 | Goto ........................... 385/129 |

(Continued)

*Primary Examiner*—Frank G Font
*Assistant Examiner*—Ryan Lepisto
(74) *Attorney, Agent, or Firm*—Amin, Turocy & Calvin, LLP (57) ABSTRACT

An integrated bi-directional transceiver device for multiple wavelength optical signals that has a high level of wavelength isolation at the receivers of the device and low cross-talk of light between an external laser transmitter and the receivers. A WDM planar light wave circuit (PLC) assembly combines high spatial light confinement waveguide structures and a variable thickness dielectric wavelength selective filter (WSF) on the surface of the device to reflect a first wavelength signal and to pass a second wavelength signal. Embodiments of the invention include branching waveguide structures and folded path waveguide assemblies with multiple WSF's.

51 Claims, 9 Drawing Sheets

U.S. PATENT DOCUMENTS

| | | | |
|---|---|---|---|
| 6,415,082 B1 * | 7/2002 | Wach | 385/39 |
| 6,438,291 B1 * | 8/2002 | Duck et al. | 385/34 |
| 6,480,639 B2 * | 11/2002 | Hashimoto et al. | 385/14 |
| 6,480,647 B1 * | 11/2002 | Kitamura | 385/24 |
| 6,507,680 B1 * | 1/2003 | Nishimura et al. | 385/14 |
| 6,527,454 B1 * | 3/2003 | Saito et al. | 385/88 |
| 6,535,670 B1 * | 3/2003 | Takei et al. | 385/47 |
| 6,647,184 B2 * | 11/2003 | Ukechi et al. | 385/47 |
| 6,684,012 B2 * | 1/2004 | Kimura | 385/49 |
| 6,718,076 B2 * | 4/2004 | Bures et al. | 385/7 |
| 6,744,945 B2 * | 6/2004 | Kinoshita et al. | 385/24 |
| 6,754,403 B1 * | 6/2004 | Schmid | 385/7 |
| 6,760,510 B2 * | 7/2004 | Kimura | 385/24 |
| 6,775,439 B2 * | 8/2004 | Takano et al. | 385/47 |
| 6,868,210 B2 * | 3/2005 | Takahashi et al. | 385/50 |
| 6,873,767 B2 * | 3/2005 | Kuhara | 385/49 |
| 2001/0053262 A1 * | 12/2001 | Kinoshita et al. | 385/24 |
| 2001/0053265 A1 * | 12/2001 | Yamashita et al. | 385/48 |
| 2003/0095744 A1 * | 5/2003 | Takano et al. | 385/24 |
| 2003/0123819 A1 * | 7/2003 | Nakanishi et al. | 385/92 |
| 2003/0210866 A1 * | 11/2003 | Kuhara et al. | 385/49 |
| 2005/0018993 A1 * | 1/2005 | Rolston et al. | 385/137 |

* cited by examiner

FIG. 1

PRIOR ART

(a) Top View

Fig. 5

(b) Side View

BI-DIRECTIONAL PLC TRANSCEIVER DEVICE

FIELD OF THE INVENTION

This invention relates to bi-directional planar light circuit (PLC) transceiver devices that enable analog and digital media communication over a single fiber.

BACKGROUND OF THE INVENTION

Optical transceiver devices are well known in the art and are often found in applications where a bi-directional data stream is employed for the transmission of both video, in one direction, and data, in two directions, over a single mode fiber optic cable. A 1300 nm emitter and a 1300 nm receiver are generally used for data communication and a 1550 nm receiver for video information.

Typically, these devices have been produced using conventional bulk optical elements such as lenses, WDM filters, and beam splitters, built into the device, to separate the analog and digital transmission wavelengths and to direct the signals back and forth from the emitter and receivers to the input optical fiber carrying the transmission signal. Recently, a new generation of devices has been demonstrated using planar light circuit (PLC) technology.

A major problem with conventional bulk optic transceiver devices is scattering of light from the edges and surfaces of the various components, lenses, WDM filters, and beam splitters, leading to cross-talk, i.e. light from the external 1300 nm emitter leaking into the photodetector receivers, and poor wavelength isolation due to insufficient blockage of selective light by the dielectric filters. In addition, in order to maintain a high level of wavelength isolation i.e. >25 dB, for example, the overall light polarization requires that incident light be close to a normal incidence angle at the surface of the dielectric filters. Any incident light at a different angle is leaked through the filter.

To circumvent the cross-talk and high wavelength isolation problems associated with bulk optic transceiver devices, prior art Japan Patent Office Publication number 11-068705 discloses a two-way optical transmission and reception module based on a PLC chip, in which signals at first and second (1550 nanometer and 1310 nanometer) wavelengths are separated from an input light beam using a WDM filter assembly placed in a slot in the PLC chip. The dielectric multi-layer filter, inserted into the slot, is positioned at the tee of a branching waveguide structure to obtain the aforementioned purpose. Japan Patent Office Publication number 11-248977 also discloses transceiver devices with filters inserted into waveguide structures.

The use of waveguide structures significantly reduces light scattering because of the light confinement characteristics of waveguides, resulting in essentially no cross-talk of light between the emitter and the receivers of the device. In addition, the combination of waveguide structures and dielectric filters inserted in the waveguide enhances the wavelength isolation properties of the device.

A major manufacturing problem with prior art PLC based transceiver apparatus is the required filter thickness tolerance, on the order of micrometers, necessary for positioning the dielectric filter in a slot created directly in the optical path of the waveguides of the device. In order for the transmitted light signal to cross the filter, from one waveguide into another, without a significant loss off light at the coupling interface, the thickness of the slot, typically 20 micrometers, needs to be carefully controlled, as small deviations in thickness can result in significant power attenuation. Similarly, the thickness of the filter, typically 14 micrometers, needs to be carefully controlled in order to not exceed the thickness requirement. As such, the handling of thin filters creates manufacturing difficulties.

In addition, the fabrication of a waveguide channel trench designed to receive the filter requires a relatively large surface area chip, increasing the size and cost of the apparatus.

BRIEF SUMMARY OF THE INVENTION

The invention comprises an improved bi-directional optical transceiver device for multiple wavelength signals that has a high level of wavelength isolation at the receivers of the device and low cross-talk of light between an external laser transmitter and the receivers. The device uses a combination of high spatial light confinement waveguide structures and a variable thickness dielectric wavelength selective filter (WSF) in a WDM planar light wave circuit (PLC) assembly.

Cross-talk in the device is minimized by using a specific waveguide design and wavelength isolation is enhanced by one or more dielectric interference filters placed on the surface of the PLC. In addition, the PLC can be produced using a material that absorbs light selectively so that the material itself acts as a WSF.

Typically, in prior art devices, light passing through an internal filter is directed to a small single-mode waveguide. In the PLC of the invention however, light passing through the WSF is directly interfaced to a detector that is five to ten times larger than the aperture of a single mode waveguide, making the design more tolerant to beam expansion in the free-space path through the filter.

By placing one or more WSF's on the surface of the PLC, a waveguide channel trench for each filter is not required, and thicker filters can be used to reduce chip manufacturing costs. In addition, a dichroic or interference WSF can be advantageously placed on an edge of the PLC chip using a direct deposition process with a signal detector placed directly over the WSF.

DETAILED DESCRIPTION OF THE INVENTION

Figure 1:
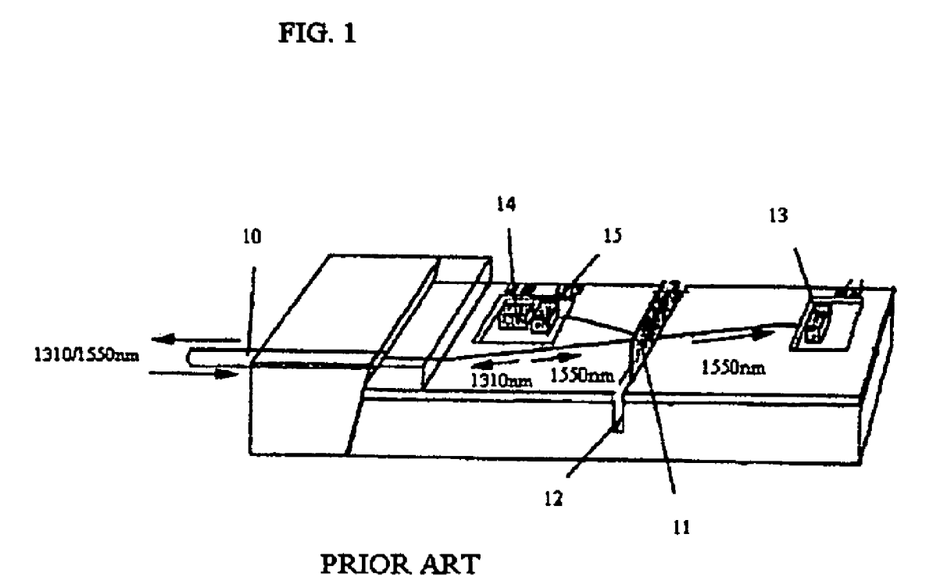
FIG. 1 is a schematic diagram of a prior art transceiver device.

A typical prior art data and video transmission transceiver apparatus is illustrated in FIG. 1, where bi-directional wavelength optical communication signals can be sent and received simultaneously. In such apparatus, an optical fiber 10 transmitting upstream and downstream 1310 nm and 1550 nm signals is interfaced to the bi-directional transceiver device where a wavelength division multiplexer (WDM) filter assembly 11, placed in a slot 12, separates the incoming 1310 nm and 1550 nm signals and distributes them between a 1550 nm photodiode detector 13 and a 1310 nm photodiode detector 14. Simultaneously, a 1310 nm laser diode 15 interfaced to the bi-directional transceiver device transmits 1310 nm signals upstream into the fiber. Clear separation of signals in the apparatus is a problem because of cross-talk between the 1310 nm signal from the built-in laser diode leaking into the 1310 nm and 1550 nm photodetectors, and because of poor wavelength isolation at each of the 1310 nm and 1550 nm photodetectors.

As stated above, manufacturing of these devices requires extremely narrow spatial tolerances (on the order of six microns) to machine the slot in the optical path of the PLC chip and to maintain the thickness dimension of the WDM filter. If the spatial and thickness tolerance requirements are not precisely met, the devices will not achieve performance specifications.

Figure 2:
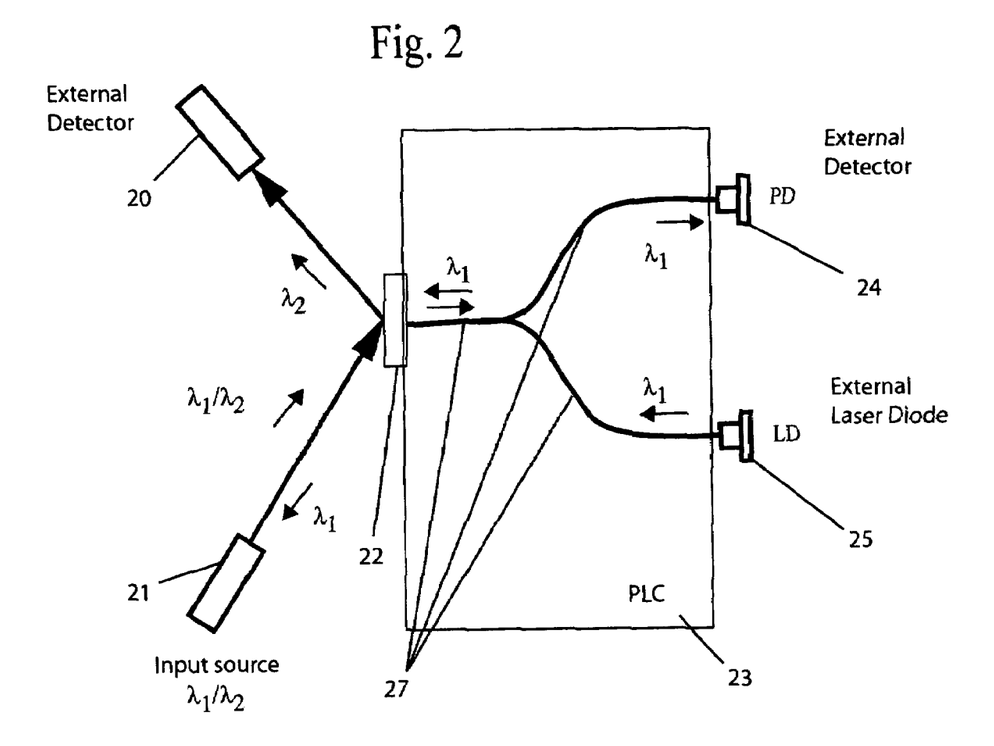
FIG. 2 is an illustrative diagram of a PLC transceiver device in accordance with the principles of this invention.

In one embodiment, of the invention, as shown in FIG. 2, a branching waveguide structure 27 is defined in a PLC chip 23.

One branch of the waveguide structure 27 is coupled to an external photodiode detector 24 for detecting $\lambda_1$ wavelength signals. The other branch of the waveguide is coupled to an external laser diode 25.

A WSF 22 on the surface of the chip 23 is adapted to reflect a band of signals centered around a $\lambda_2$ wavelength and to pass a band of signals centered around a $\lambda_1$ wavelength.

In operation, the input signal source 21 that includes light signals at both $\lambda_1$ and $\lambda_2$ wavelengths is coupled to the PLC so that the input signal light beam is directed toward the WSF 22 at a forty-five degree angle, for example, causing reflection of the $\lambda_2$ signal to an external detector 20. Accordingly, only $\lambda_1$ signals enter the waveguide structure.

The detector 24 at one branch of the waveguide thus detects clear $\lambda_1$ signals with high extinction wavelength isolation from the $\lambda_2$ signal. Similarly, the detector 20 also exhibits high extinction wavelength isolation from $\lambda_1$ signals from the laser diode 25 and from incoming $\lambda_1$ signals in the fiber.

Figure 3:
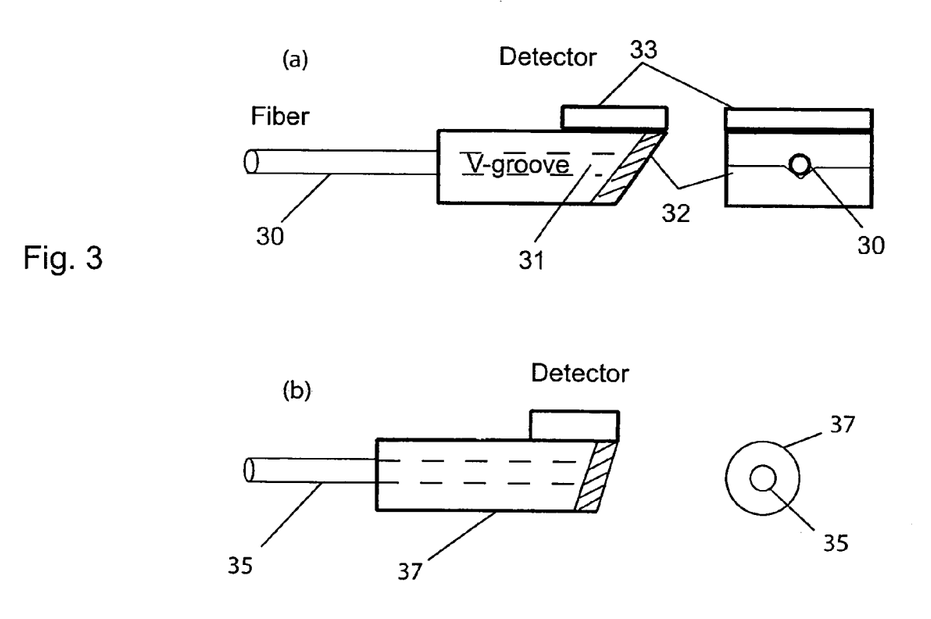
FIGS. 3(a) and 3(b) are schematic diagrams of an input signal assembly of the invention.
Figure 4:
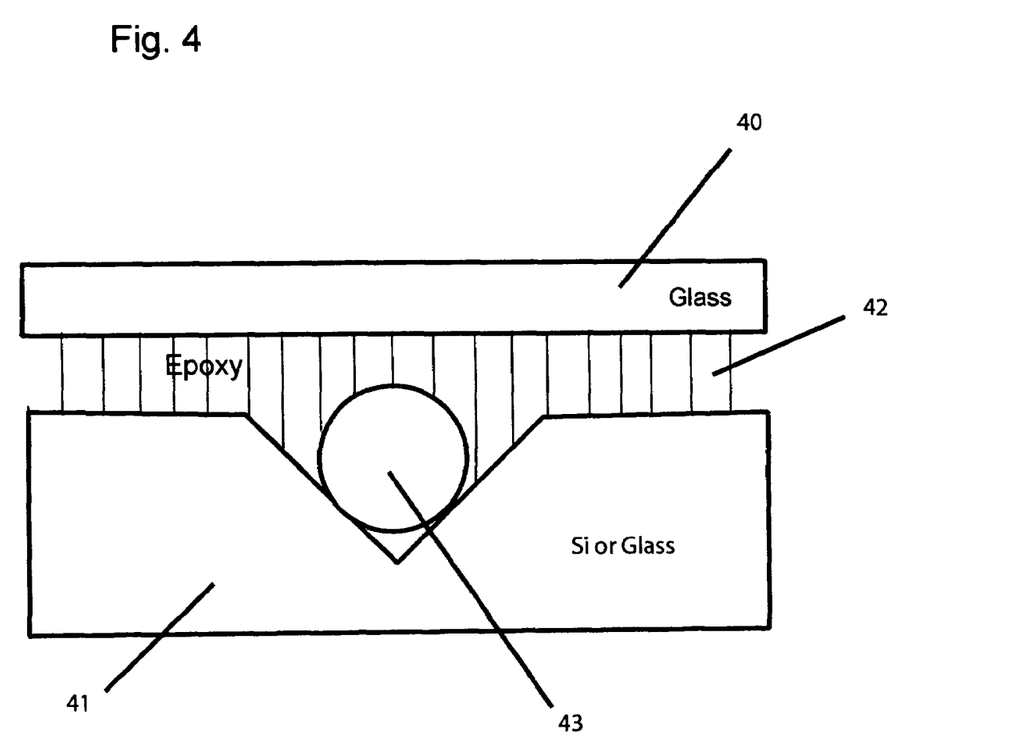
FIG. 4 is a schematic diagram of a V-groove assembly of the invention.

Coupling of the input signal light beam to the PLC chip can be conveniently accomplished by using a commercially available V-groove device for an optical fiber as shown in FIGS. 3 and 4. Other devices can also be used for coupling an input signal light beam including a fiber within a ferrule or a freestanding angle polished fiber.

With reference to FIG. 3(a), the end face 32 of a V-groove device 31 holding an input signal fiber 30 is cut at a forty-five degree angle, and is polished with the polished edge abutted against the PLC chip to reflect signals to an external detector 33. The detector 33 can be positioned if desired, along the top surface of the V-groove device as shown.

With reference to FIG. 3(b), an input signal fiber 35 is shown placed inside a ferrule structure 37 to couple the fiber to a PLC chip. The ferrule can be made of glass, silicon, or a near-infrared transparent material.

With reference to FIG. 4, a V-groove device is shown where an input signal fiber 43 is captured in a V-groove shaped substrate 41 using an adhesive coating 42 to adhere a glass cover layer 40 over the fiber to the substrate 41. The cover layer 40 is transparent to a selected wavelength. The V-groove itself can be defined in a silicon or glass substrate, as is well known in the art.

Figure 5:
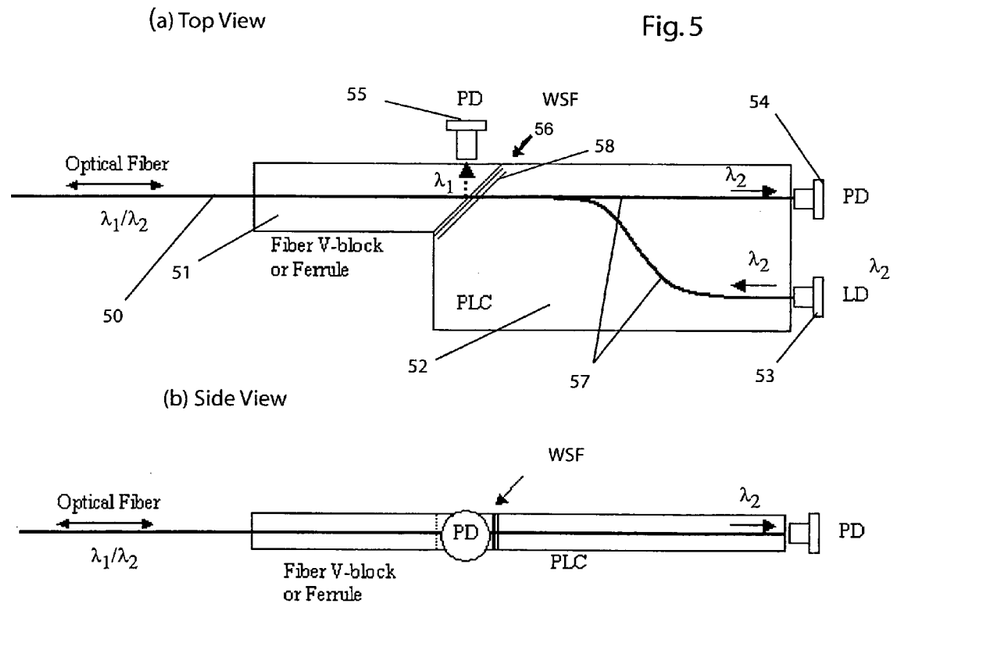
FIGS. 5(a) and 5(b) are illustrative views of a PLC/WSF embodiment of the invention.

Another embodiment of the invention is shown in FIGS. 5(a) and 5(b) where an input signal optical fiber 50, is set in a V-groove block structure 51, and is interfaced to a PLC 52 that has an edge surface 58 cut at a forty-five degree angle.

A WSF 56, configured to reflect signals at a first wavelength $\lambda_1$ and to pass signals at a second wavelength $\lambda_2$, is positioned on the cut edge surface 58 of the PLC so that the first wavelength signal is reflected at a forty-five degree angle.

As shown in FIGS. 5(a) and 5(b), an external $\lambda_1$ detector photodiode 55, is placed adjacent to an edge of the PLC to receive signals reflected by the WSF.

A waveguide assembly 57 directs the $\lambda_2$ signals from the input signal optical fiber that are passed through the WSF to an external photodiode detector 54 and directs $\lambda_2$ signals from an external laser diode signal source 53 through the WSF to the input signal optical fiber.

A dual path branching waveguide assembly is illustrated, although a single path waveguide assembly can be also be used. In addition, an external laser diode signal source is illustrated but it is understood that other types of signal sources can be used including, for example, an LED.

The PLC chip can be fabricated using an intrinsic material, designed to absorb specific wavelength signals. The combination of absorptive chip material and the WSF provides additional filtering so that any undesired signals that may not be reflected by the WSF can be effectively absorbed by the PLC chip material to prevent cross-talk. If the absorptive material is not present, a second WSF can be used to reflect unwanted signals from reaching the $\lambda_2$ detector.

Figure 6:
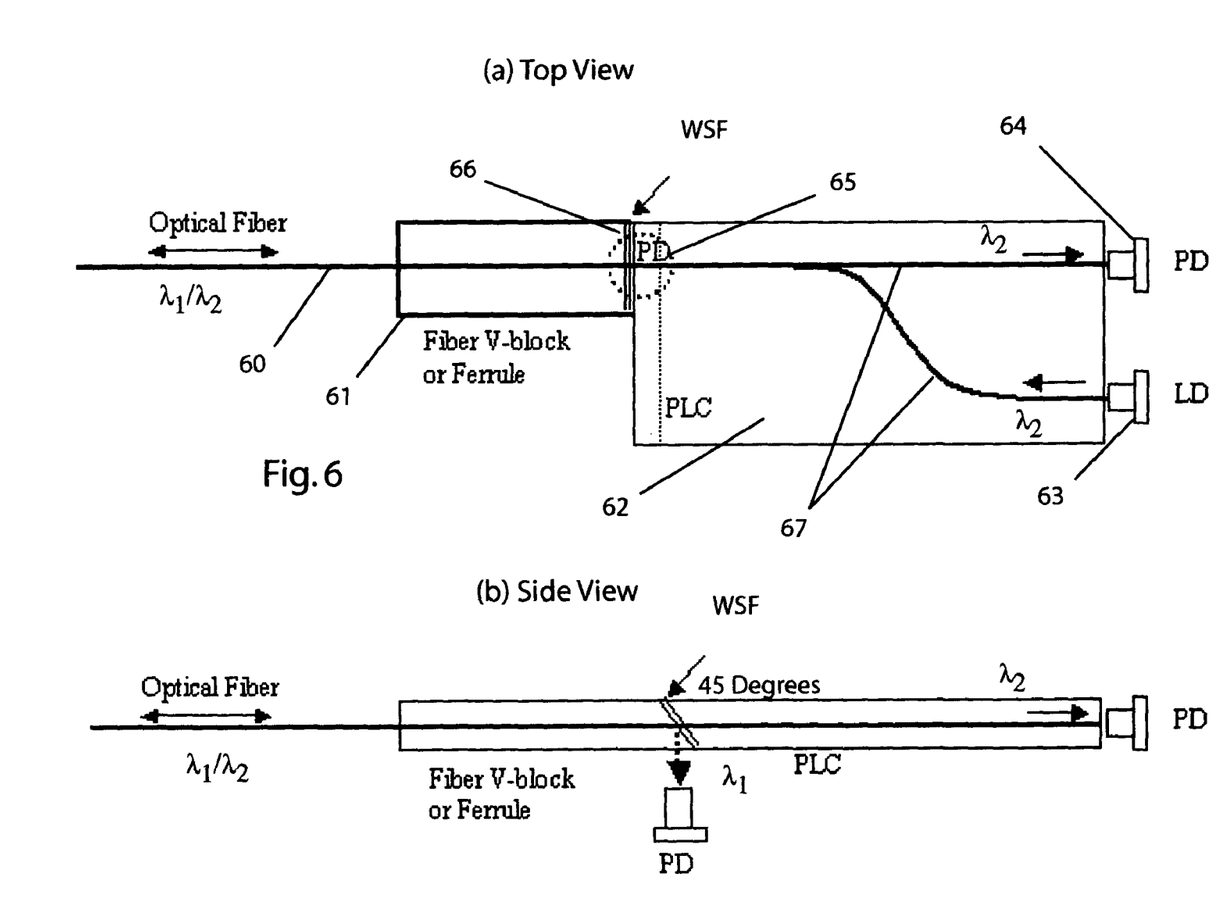
FIGS. 6(a) and 6(b) are illustrative views of another embodiment of a PLC/WSF of the invention.

With reference to FIGS. 6(a) and 6(b), another embodiment of the invention has an input signal optical fiber 60, set in a V-groove block or ferrule structure 61, interfaced to a PLC 62.

A WSF 66, configured to reflect signals at a first wavelength $\lambda_1$ and to pass signals at a second wavelength $\lambda_2$, is positioned along the vertical axis of the PLC at a forty-five degree angle. An external $\lambda_1$ detector photodiode 65 is also positioned along the vertical axis of the PLC to receive the signals reflected by the WSF, as shown in FIG. 6(b).

A PLC waveguide assembly 67 directs the $\lambda_2$ signals that are passed through the WSF to an external photodiode detector 64, placed on an edge surface of the PLC.

The waveguide assembly also directs signals from an external $\lambda_2$ laser diode source 63 through the WSF to the input signal optical fiber.

A dual path branching waveguide assembly is illustrated, although a single path waveguide assembly can be also be used. In addition, an external laser diode signal source is illustrated but it is understood that other types of signal sources can be used including, for example, an LED.

As stated above, the PLC chip can be fabricated using an intrinsic material, designed to absorb specific wavelength signals, to prevent cross-talk. If the absorptive material is not present, a second WSF can be used to prevent unwanted signals from reaching the $\lambda_2$ detector.

Figure 7:
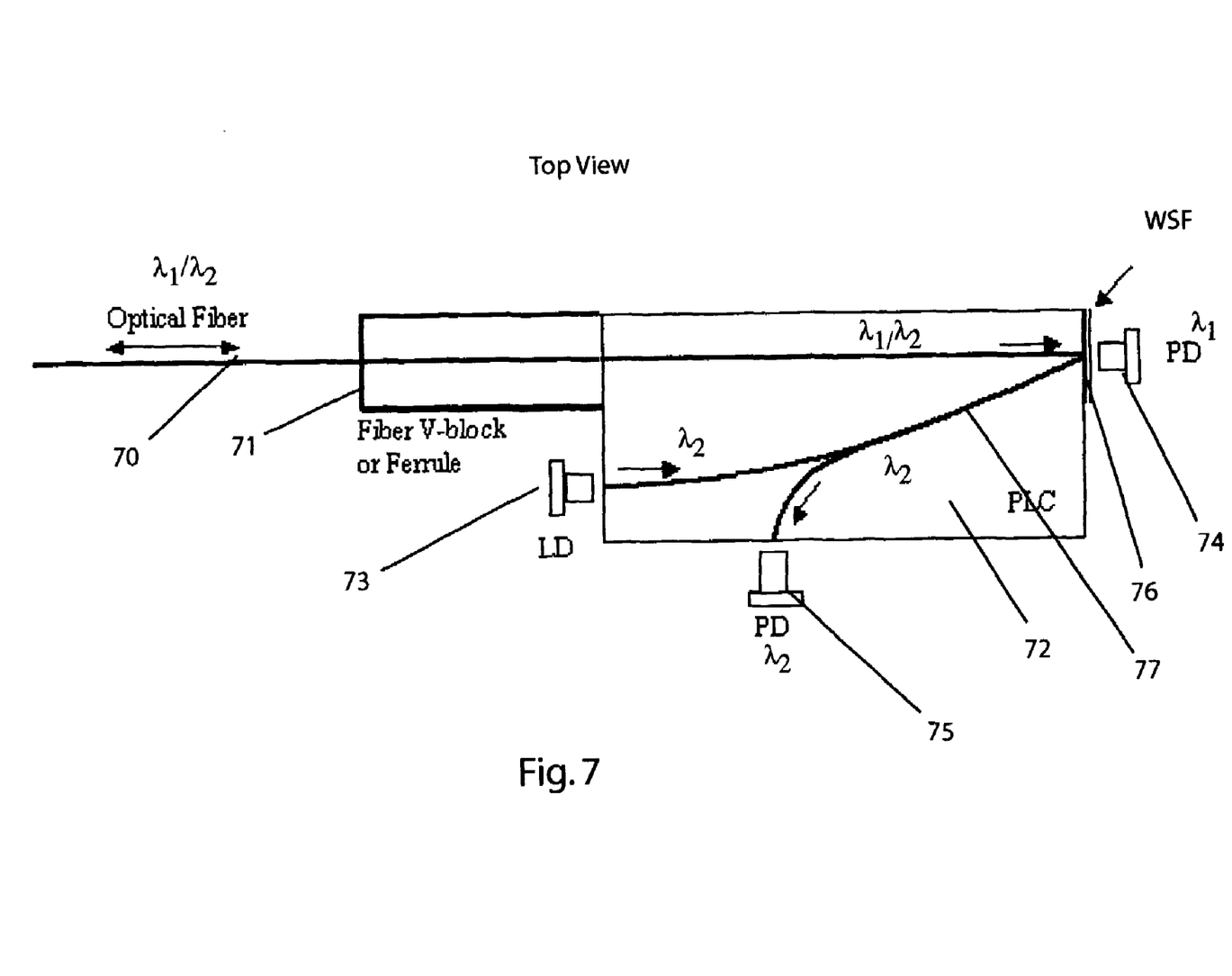
FIG. 7 is an illustrative view of a PLC of the invention with a folded optical beam path.

In another embodiment of the invention, a folded beam path configuration that can reduce the size of a PLC chip is shown in FIG. 7 with an input signal optical fiber 70 set in a V-groove block or ferrule structure 71 and interfaced to a PLC 72.

A WSF 76, configured to pass signals at a first wavelength $\lambda_1$ and to reflect signals at a second wavelength $\lambda_2$ is placed along a first edge surface of the PLC. An external detector photodiode 74 is positioned adjacent to said first edge surface to receive the $\lambda_1$ signals passed through the WSF.

A bi-directional waveguide assembly 77 directs the $\lambda_2$ signals reflected by the WSF to an external photodiode detector 75 positioned adjacent to a second edge surface of the PLC and directs the signals from an external laser diode 73 to the WSF for reflection to the $\lambda_2$ detector.

A dual path branching waveguide assembly is illustrated, although a single path waveguide assembly can be also be used. In addition, an external laser diode signal source is illustrated but it is understood that other types of signal sources can be used including, for example, an LED.

Figure 8:
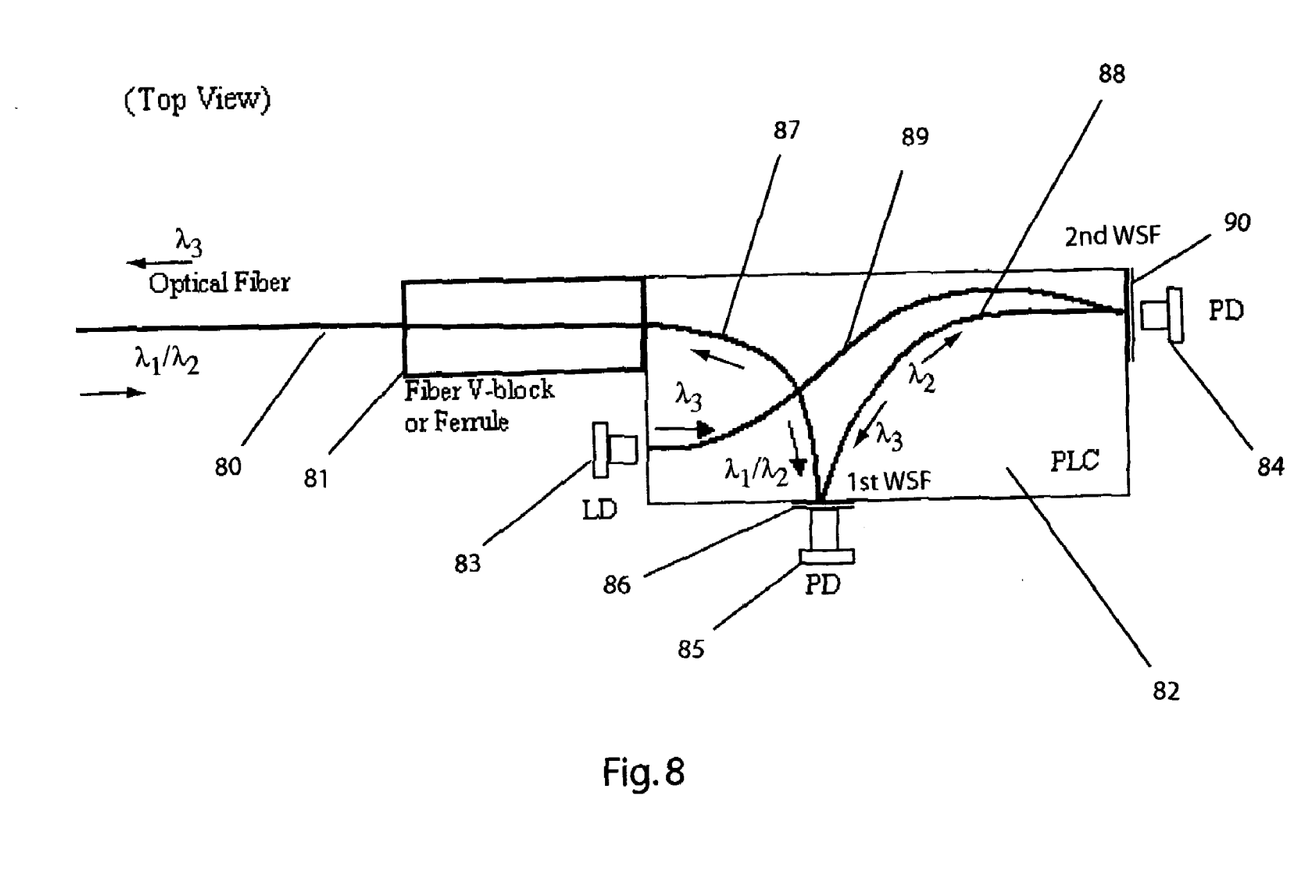
FIG. 8 is an illustrative view of a PLC of the invention having a multiple folded beam path configuration.

In another embodiment of the invention, a multiple wavelength folded beam path configuration is shown in FIG. 8 where part of the beam is transmitted and part is reflected. Multiple folds can be configured, without cross-talk between waveguides, when the waveguide crossing angle is optimally ninety degrees.

With reference to FIG. 8, an input signal optical fiber 80, set in a V-groove block or ferrule structure 81, is interfaced to a PLC 82.

A first PLC waveguide assembly 87 directs multiple wavelength signals $\lambda_1$, $\lambda_2$, and $\lambda_3$ from an optical fiber 80 to a first WSF 86. The WSF 86 is placed on an edge surface of the PLC and is configured to pass $\lambda_1$ signals and to reflect $\lambda_2$ signals. An external photodiode detector 85 is positioned adjacent to the first WSF 86 to receive the $\lambda_1$ signals.

A second PLC waveguide assembly 88 directs the $\lambda_2$ signals, reflected by the first WSF 86, to a second WSF 90 placed on an edge surface of the PLC. The second WSF is configured to pass $\lambda_2$ signals.

An external photodiode detector 84 is positioned adjacent to the second WSF 90 to receive the $\lambda_2$ signals directed by the second PLC waveguide assembly 88.

A third PLC waveguide assembly 89 directs $\lambda_3$ signals from an external laser diode 83 to the second WSF 90 where the signal is reflected into the second PLC waveguide assembly 88 and subsequently into the first PLC waveguide assembly 87 where it is directed to the optical fiber 80.

An external laser diode signal source is illustrated but it is understood that other types of signal sources can be used including, for example, an LED.

Figure 9:
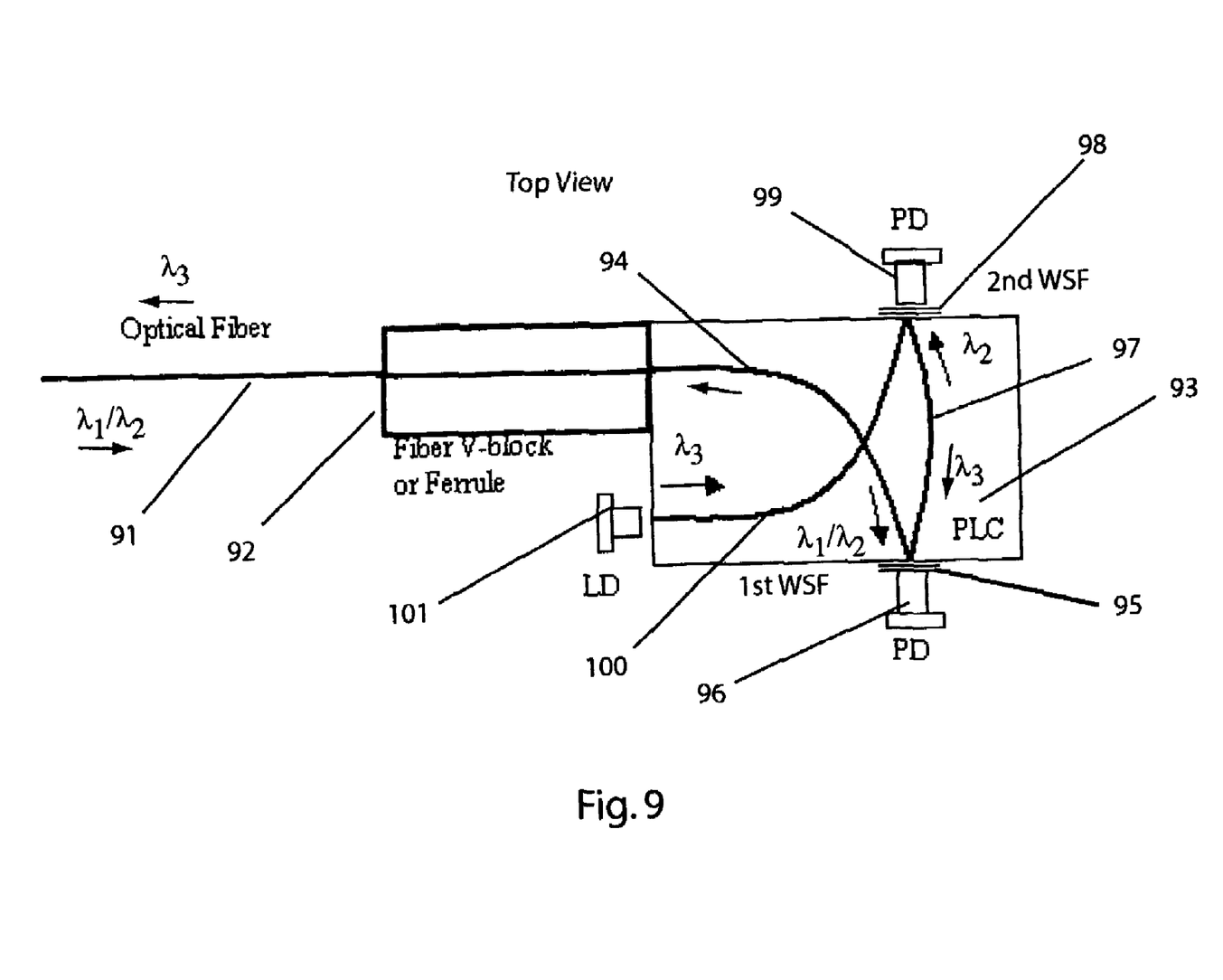
FIG. 9 is an illustrative view of another embodiment of the invention with a multiple folded beam path configuration.

In another embodiment of the invention, a multiple-folded beam path configuration is shown in FIG. 9.

With reference to FIG. 9, an input signal optical fiber 91, set in a V-groove block structure 92, is interfaced to a PLC 93.

A first PLC waveguide assembly 94 directs the multiple wavelength signals $\lambda_1$, $\lambda_2$, and $\lambda_3$ from the input signal optical fiber 91 to a first WSF 95. The first WSF 95 is placed on a first edge surface of the PLC and is configured to pass $\lambda_1$ signals and to reflect $\lambda_2$ signals. An external photodiode detector 96 is positioned adjacent to the first WSF 95 to receive the $\lambda_1$ signals.

A second PLC waveguide assembly 97 directs the $\lambda_2$ signals reflected by the first WSF 95 to a second WSF 98; placed on a second edge of the PLC and configured to pass $\lambda_2$ signals.

An external photodiode detector 99 is positioned adjacent to the second WSF 98 to receive the $\lambda_2$ signals directed by the second PLC waveguide assembly 97.

A third PLC waveguide assembly 100 directs $\lambda_3$ signals from an external laser diode 101 to the second WSF 98 where the signal is reflected into the second PLC waveguide assembly 97 and subsequently into the first PLC waveguide assembly 94 where it is directed to the optical fiber 91.

An external laser diode signal source is illustrated but it is understood that other types of signal sources can be used including, for example, an LED.

Various waveguide structures in the PLC of the invention are shown but it is understood that other types of waveguide structures, including tapered waveguides, can be used to direct light from external signal sources and to distribute light signals within the PLC assembly, to improve PLC light coupling efficiency.

Although the various features of novelty that characterize the invention have been described in terms of certain preferred embodiments, other embodiments will become apparent to those of ordinary skill in the art, in view of the disclosure herein. Accordingly, the present invention is not limited by the recitation of the preferred embodiments, but is instead intended to be defined solely by reference to the appended claims.

What is claimed is:

1. A bi-directional planar light circuit transceiver device for separating optical signals at first and second wavelengths from one another from a single input signal source, the first wavelength different from the second wavelength, comprising
    a planar light circuit comprising an internal waveguide structure adapted to direct optical signals from a single input signal source in the planar light circuit;
    a wavelength selective filter configured to pass a band of signals centered at said first wavelength and to reflect a band of signals centered at said second wavelength, the bands of signals centered at the first and second wavelengths comprised in the single input signal source, the wavelength selective filter positioned external to the planar light circuit and placed in energy coupled proximity to an external surface of the planar light circuit; and
    a first signal detector and a second signal detector positioned such that the first signal detector detects the band of signals centered at said first wavelength and the second signal detector detects the band of signals centered at said second wavelength.

2. A bi-directional planar light circuit transceiver device as in claim 1 wherein at least one of the first signal detector and the second signal detector is placed in energy-coupled proximity to the wavelength selective filter.

3. A bi-directional planar light circuit transceiver device as in claim 1 wherein the wavelength selective filter is placed in energy-coupled proximity to said external surface of the planar light circuit using a deposition process.

4. A bi-directional planar light circuit transceiver device as in claim 1 wherein said internal waveguide structure has an input end and an output end, and the wavelength selective filter placed in a proximal relationship with said input end.

5. A bi-directional planar light circuit transceiver device as in claim 1 wherein said internal waveguide structure has an input end and an output end, and the wavelength selective filter placed in a proximal relationship with said output end.

6. A bi-directional planar light circuit transceiver device as in claim 1 wherein said internal waveguide structure comprises a bi-directional branching waveguide having input and output ports.

7. A bi-directional planar light circuit transceiver device as in claim 6 wherein the wavelength selective filter is placed in a proximal relationship with said branching waveguide input port.

8. A bi-directional planar light circuit transceiver device as in claim 6 wherein the wavelength selective filter is placed in a proximal relationship with said branching waveguide output port.

9. A bi-directional planar light circuit transceiver device as in claim 1 wherein the planar light circuit is fabricated with material having intrinsic wavelength selection absorption properties to pass signals at said first wavelength and to reflect signals at said second wavelength.

10. A bi-directional planar light circuit transceiver device as in claim 1 wherein the wavelength selective filter is placed on the surface of the planar light circuit.

11. A bi-directional transceiver device as in claim 1 wherein said waveguides comprise an aperture having a first surface area and at least one of said first and second signal detectors comprises a second surface area, said second surface area being 5 to 10 times larger than said first surface area.

12. A bi-directional transceiver device as in claim 1 wherein the wavelength selective filter comprises a dielectric interference filter.

13. A bi-directional planar light circuit transceiver device for separating optical signals at first and second wavelengths from one another from a single input signal source, the first wavelength different from the second wavelength, comprising
   a planar light circuit comprising an internal waveguide structure adapted to direct optical signals from a single input wavelength source in the planar light circuit;
   mirror means configured to pass signals at said first wavelength and to reflect signals at said second wavelength, said mirror means positioned external to the planar light circuit and placed in energy coupled proximity to an external surface of the planar light circuit, the signals at the first and second wavelengths comprised in the single input wavelength source; and
   a first signal detector and a second signal detector positioned such that the first signal detector detects the signals at said first wavelength and the second signal detector detects the signals at said second wavelength.

14. A bi-directional planar light circuit transceiver device as in claim 13 wherein the planar light circuit is fabricated with material having intrinsic wavelength selection absorption properties to pass signals at said first wavelength and to reflect signals at said second wavelength.

15. A bi-directional planar light circuit transceiver device as in claim 13 wherein the planar light circuit is fabricated with material having intrinsic wavelength selection absorption properties to pass signals at said first wavelength and to reflect signals at said second wavelength.

16. A bi-directional planar light circuit transceiver device as in claim 13 wherein the mirror means is placed on the surface of the planar light circuit.

17. A planar light circuit transceiver device for separating optical signals at first and second wavelengths in a single input signal source from one another, the first wavelength different from the second wavelength, comprising
   a wavelength selective filter configured to pass a band of signals centered at said first wavelength and to reflect a band of signals centered at said second wavelength, the bands of signals centered at the first and second wavelengths comprised in the single input signal source, the wavelength selective filter positioned external to a planar light circuit and placed in energy coupled proximity to an external surface of the planar light circuit; and
   the planar light circuit comprising an internal branching waveguide structure having an input end and first and second output ends, said input end adapted to direct said first wavelength signals to a first signal detector at said first output end and to direct said second wavelength signals to a second signal detector at said second output end.

18. A planar light circuit transceiver device as in claim 17 wherein said waveguides comprise an aperture having a first surface area and at least one of said first and second signal detectors comprises a second surface area, said second surface area being 5 to 10 times larger than said first surface area.

19. A planar light circuit transceiver device as in claim 17 wherein said external signal source is a laser diode.

20. A planar light circuit transceiver device as in claim 17 wherein said external signal source is a LED.

21. A planar light circuit transceiver device as in claim 17 wherein said external signal source is directly attached to the planar light circuit.

22. A planar light circuit transceiver device as in claim 17 wherein said external signal source is placed in close proximity to the planar light circuit.

23. A planar light circuit transceiver device as in claim 17 wherein said internal branching waveguide structure comprises tapered waveguides.

24. A planar light circuit transceiver device as in claim 17 wherein the wavelength selective filter is placed on the surface of the planar light circuit.

25. A planar light circuit transceiver device as in claim 17 wherein the wavelength selective filter comprises a dielectric interference filter.

26. A planar light circuit transceiver assembly for separating optical signals at first and second wavelengths in a single input signal source from one another, the first wavelength different from the second wavelength, said assembly comprising
   a planar light circuit comprising an internal waveguide structure adapted to direct optical signals in the planar light circuit;
   a wavelength selective filter configured to pass a band of signals centered at said first wavelength and to reflect a band of signals centered at said second wavelength, the bands of signals centered at the first and second wavelengths comprised in the single input signal source, the wavelength selective filter positioned external to the planar light circuit and placed in energy coupled proximity to an external surface of the planar light circuit;
   means for directing input optical signals to the wavelength selective filter; and
   a first signal detector and a second signal detector positioned such that the first signal detector detects the band of signals centered at said first wavelength and the second signal detector detects the band of signals centered at said second wavelength.

27. A planar light circuit transceiver assembly as in claim 26 wherein said means for directing input optical signals comprises an optical fiber in a V-groove structure.

28. A planar light circuit transceiver assembly as in claim 27 wherein said V-groove structure has a polished end face cut at a forty-five degree angle.

29. A planar light circuit transceiver assembly as in claim 27 wherein said V-groove structure is defined in a substrate, said optical fiber captured in said V-groove structure using an adhesive coating to adhere a glass cover layer over said optical fiber to said substrate.

30. A planar light circuit transceiver assembly as in claim 29 wherein said substrate is glass.

31. A planar light circuit transceiver assembly as in claim 29 wherein said substrate is silicon.

32. A planar light circuit transceiver assembly as in claim 27 comprising a component for detecting signals at said second wavelength located on the surface of said V-groove structure.

33. A planar light circuit transceiver assembly as in claim 26 wherein said means for directing input optical signals comprises an optical fiber in a ferrule structure.

34. A planar light circuit transceiver assembly as in claim 33 wherein the second signal detector is positioned for detecting signals at said second wavelength located on the surface of said ferrule structure.

35. A planar light circuit transceiver assembly as in claim 33 wherein said ferrule structure has a polished end face cut at a forty-five degree angle.

36. A planar light circuit transceiver assembly as in claim 33 wherein said ferrule structure is made of glass.

37. A planar light circuit transceiver assembly as in claim 33 wherein said ferrule structure is made of silicon.

38. A planar light circuit transceiver assembly as in claim 33 wherein said ferrule structure is made of a near infrared transparent material.

39. A planar light circuit transceiver assembly as in claim 26 wherein the wavelength selective filter is placed on the surface of the planar light circuit.

40. A planar light circuit transceiver assembly as in claim 26 wherein said waveguides comprise an aperture having a first surface area and at least one of said first and second signal detectors comprises a second surface area, said second surface area being 5 to 10 times larger than said first surface area.

41. A planar light circuit transceiver assembly as in claim 26 wherein the wavelength selective filter comprises a dielectric interference filter.

42. A device for separating signals at first and second wavelengths in a single input signal source from one another, the first wavelength different from the second wavelength, comprising
 a wave guide structure for transmitting said signals along an optical path between an input and a first output and a second output defined at the surface of the wave guide structure including first and second wave guides for defining first and second light paths from said input to said first and second outputs respectively;
 a wavelength selective filter on the surface of the wave guide structure in said optical path for separating out one of said first and second wavelengths, the signals at the first and second wavelengths comprised in the single input signal source, the wavelength selective filter external to the wave guide structure; and
 a first signal detector located at said first output for detecting signals at said first wavelength and a second signal detector located at said second output for detecting signals at said second wavelength.

43. A device as in claim 42 wherein said wavelength selective filter transmits said first wavelength and reflects said second wavelength.

44. A device as in claim 42 wherein said wavelength selective filter is positioned in said optical path on the surface of the wave guide structure at said output.

45. A device as in claim 42 wherein the wavelength selective filter is placed on the surface of the wave guide structure.

46. A planar light circuit transceiver device for separating optical signals at first and second wavelengths from a single input signal source from one another, the first wavelength different from the second wavelength, comprising
 a planar light circuit comprising an internal branching waveguide structure having an input end and first and second output ends, the input end adapted to direct the first wavelength signal to a first detector at the first output end and to a second detector at the second output end whereby the detector at the first output end detects a clear first wavelength signal with high extinction wavelength isolation from the second wavelength signal; and
 a wavelength selective filter configured to pass a band of signals centered at said first wavelength and to reflect a band of signals centered at said second wavelength, the bands of signals centered at the first and second wavelengths comprised in the single input signal source, the wavelength selective filter positioned external to the planar light circuit and placed in energy coupled proximity to an external surface of the planar light circuit.

47. A bi-directional transceiver device that separates optical signals at a first wavelength from optical signals at a second wavelength from a single input signal source, the first wavelength different from the second wavelength, comprising
 a planar light circuit comprising an internal waveguide structure adapted to direct optical signals in the planar light circuit; and
 a wavelength selective filter configured to pass a first band of signals centered at a first wavelength and to reflect a second band of signals centered at a second wavelength, the bands of signals centered at the first and second wavelengths comprised in the single input signal source, the wavelength selective filter positioned external to the planar light circuit and placed in energy coupled proximity to an external surface of the planar light circuit,
 wherein the first band of signals centered at the first wavelength travel in two directions within the internal waveguide structure; and
 a first signal detector and a second signal detector positioned such that the first signal detector detects the band of signals centered at said first wavelength and the second signal detector detects the band of signals centered at said second wavelength.

48. A bi-directional transceiver device as in claim 47 wherein the wavelength selective filter is placed on the surface of the planar light circuit.

49. A bi-directional transceiver device as in claim 47 wherein the wavelength selective filter has a variable thickness.

50. A bi-directional transceiver device as in claim 47 wherein the wavelength selective filter comprises a dichroic wavelength selective filter.

51. A bi-directional transceiver device as in claim 47 wherein the wavelength selective filter comprises an interference wavelength selective filter.

* * * * *